(12) United States Patent
Mitani et al.

(10) Patent No.: US 7,155,975 B2
(45) Date of Patent: Jan. 2, 2007

(54) COMPOSITE SENSOR FOR DETECTING ANGULAR VELOCITY AND ACCELERATION

(75) Inventors: Tomohiro Mitani, Fukui (JP); Shoichi Takeno, Fukui (JP); Katsuhiko Omoto, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/481,436

(22) PCT Filed: Jun. 24, 2002

(86) PCT No.: PCT/JP02/06305

§ 371 (c)(1),
(2), (4) Date: Jun. 8, 2004

(87) PCT Pub. No.: WO03/001150

PCT Pub. Date: Jan. 3, 2003

(65) Prior Publication Data

US 2004/0200279 A1   Oct. 14, 2004

(30) Foreign Application Priority Data

Jun. 25, 2001 (JP) ............................. 2001-190970

(51) Int. Cl.
*G01P 1/02* (2006.01)
*G01P 9/04* (2006.01)

(52) U.S. Cl. ...................... 73/504.03; 73/511; 29/595; 361/816

(58) Field of Classification Search ............ 73/504.03, 73/504.04, 431, 855, 510–511; 29/595; 361/816, 361/818
See application file for complete search history.

(56) References Cited

U.S. PATENT DOCUMENTS

| | | | | |
|---|---|---|---|---|
| 5,099,396 A | * | 3/1992 | Barz et al. | 361/818 |
| 5,345,823 A | * | 9/1994 | Reidemeister et al. | 73/514.32 |
| 5,473,109 A | * | 12/1995 | Plankl et al. | 174/35 C |
| 6,011,700 A | * | 1/2000 | Matsuzaki | 361/816 |
| 6,472,595 B1 | * | 10/2002 | Huang | 174/35 R |

FOREIGN PATENT DOCUMENTS

| | | |
|---|---|---|
| JP | 58-88431 | 6/1983 |
| JP | 64-34779 | 3/1989 |
| JP | 4-339210 | 11/1992 |
| JP | 5-30721 | 4/1993 |
| JP | 6-265569 | 9/1994 |
| JP | 10-117082 | 5/1998 |
| JP | 10-239064 | 9/1998 |
| JP | 11-257967 | 9/1999 |

* cited by examiner

*Primary Examiner*—Hezron Williams
*Assistant Examiner*—John C Hanley
(74) *Attorney, Agent, or Firm*—Wenderoth, Lind & Ponack, L.L.P.

(57) ABSTRACT

A high-reliability complex sensor is protected against vibration and electromagnetic wave noise from outside. A shield case is provided with a power conjunction terminal, GND conjunction terminal, angular velocity conjunction terminal, X axis acceleration conjunction terminal and Y axis acceleration conjunction terminal. Both a power supply terminal of an angular velocity detection device and a power supply terminal of an acceleration detection device are electrically connected with a power connector terminal of a protection case, via the power conjunction terminal of the shield case. Both a GND terminal of the angular velocity detection device and a GND terminal of the acceleration detection device are electrically connected with a GND connector terminal of the protection case, via the GND conjunction terminal of the shield case. A circuit board is contained completely within the shield case.

17 Claims, 5 Drawing Sheets

COMPOSITE SENSOR FOR DETECTING ANGULAR VELOCITY AND ACCELERATION

This application is a National Stage application of PCT/JP02/06305, filed Jun. 24, 2002.

TECHNICAL FIELD

The present invention relates to a complex sensor for detecting angular velocity and acceleration.

BACKGROUND ART

Japanese Patent Laid-Open Application No.H10-239064 discloses a conventional complex sensor for detecting angular velocity and acceleration (hereinafter referred to as complex sensor).

Figure 6:
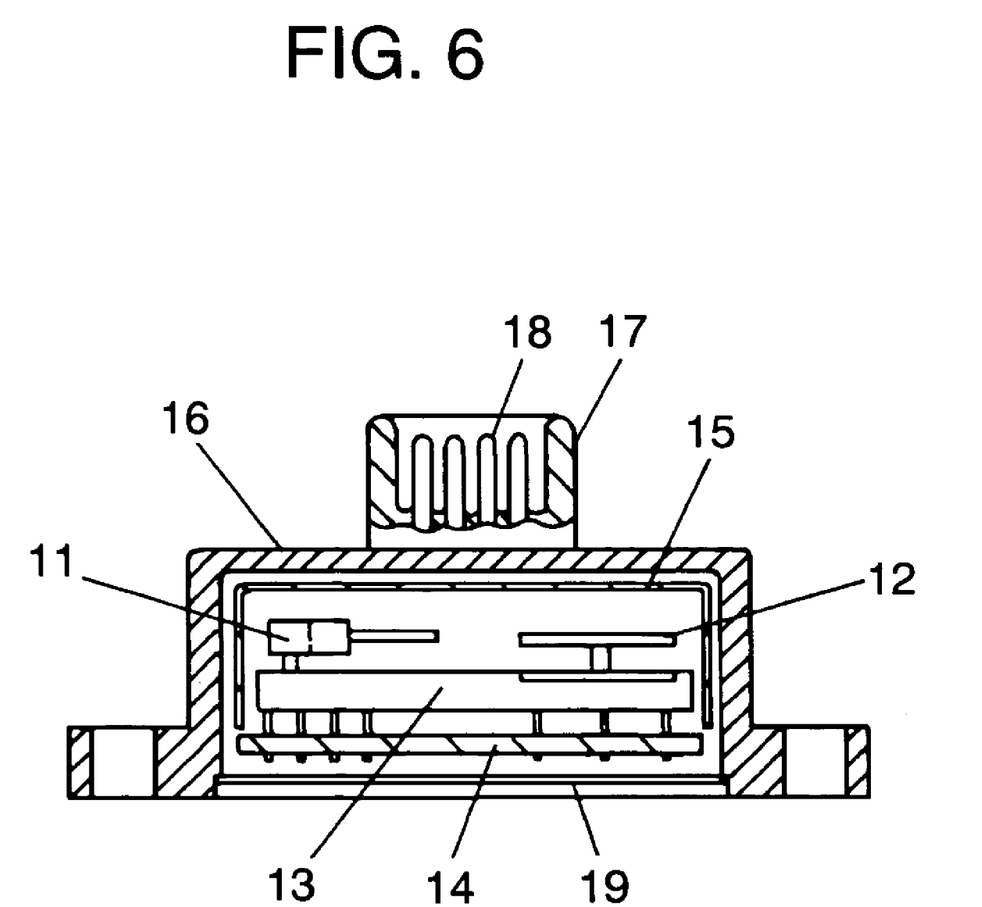
FIG. 6 is a cross sectional view of a conventional complex sensor.

FIG. 6 is a cross sectional view of the above-described complex sensor. This sensor includes supporting substrate 13 having an angular velocity detection device 11 and an acceleration detection device 12 fixed on an upper surface thereof, and circuit board 14 having thereon a signal processing circuit (not shown) for processing signals detected with respect to angular velocity and acceleration. Metal shield case 15 houses angular velocity detection device 11, acceleration detection device 12 and supporting member 13. Resin protection case 16 houses circuit board 14 and shield case 15, and is provided with connector portion 17 protruding outwardly. Connector portion 17 of protection case 16 has four connector terminals 18 disposed therein.

Respective connector terminals 18 are electrically connected with angular velocity detection device 11 and acceleration detection device 12 via lead wires (not shown) and circuit board 14. An opening of protection case 16 is closed with resin lid 19. Operation of the above-configured complex sensor is described below. When angular velocity and acceleration are given at the same time on a complex sensor, angular velocity detection device 11 outputs an angular velocity signal, while acceleration detection device 12 outputs an acceleration signal.

A signal processing circuit (not shown) disposed on circuit board 14 processes the angular velocity signal and the acceleration signal, and delivers these processed signals to a computer, via lead wires (not shown) and connector terminals 18, for detection of angular velocity and acceleration.

Need for such a complex sensor containing an angular velocity detection device and acceleration detection device in a single casing are increasing rapidly in the industry, especially in the automobile sector where compactness and lightness in terms of weight are earnestly pursued.

Such a sensor is also required to have a higher accuracy and reliability, and a lower cost.

Conventional complex sensors have been improved to an almost satisfactory level with respect to compactness and lightness in terms of weight, protection against external noise, and cost.

However, such tasks as higher level protection against vibration as well as electromagnetic wave noise from outside, further cost reduction through reduction in assembly work steps and number of parts, and the like, are still left to be solved. In order to improve these outstanding tasks to a satisfactory level, a basic layout of constituent components, arrangement of electrical connections, mechanical strength and other basic factors of a sensor need to be thoroughly reviewed.

SUMMARY OF THE INVENTION

The present invention offers a complex sensor which comprises: an angular velocity detection device for detecting angular velocity, which detection device has a power supply terminal, GND terminal and angular velocity output terminal; an acceleration detection device for detecting acceleration, which detection device has a power supply terminal, GND terminal and acceleration output terminal; and a circuit board having thereon a processing circuit for processing an angular velocity signal delivered from the angular velocity output terminal of the angular velocity detection device, and an acceleration signal delivered from the acceleration output terminal of the acceleration detection device. The angular velocity detection device and the acceleration detection device are mounted on the circuit board.

The present invention further offers a complex sensor which comprises a metal shield case for housing the circuit board and is provided with a power conjunction terminal, GND conjunction terminal, angular velocity conjunction terminal, one end of which is electrically connected with the angular velocity output terminal of the angular velocity detection device, and an acceleration conjunction terminal, one end of which is electrically connected with the acceleration output terminal of the acceleration detection device; and a protection case for housing the shield case and provided with a power connector terminal, GND connector terminal, angular velocity connector terminal which is electrically connected with another end of the angular velocity conjunction terminal of the shield case, and an acceleration connector terminal which is electrically connected with another end of the acceleration conjunction terminal of the shield case. Both the power supply terminal of the angular velocity detection device and the power supply terminal of the acceleration detection device are electrically connected with the power connector terminal of the protection case via the power conjunction terminal of the shield case, while both the GND terminal of the angular velocity detection device and the GND terminal of the acceleration detection device are electrically connected with the GND connector terminal of the protection case via the GND conjunction terminal of the shield case.

DETAILED DESCRIPTION OF PREFERRED EMBODIMENT

A complex sensor in accordance with an exemplary embodiment of the present invention is described below, referring to the drawings. The drawings are intended to provide a concept of the invention; it is to be noted that they do not represent precise dimensional relationships.

Figure 1:
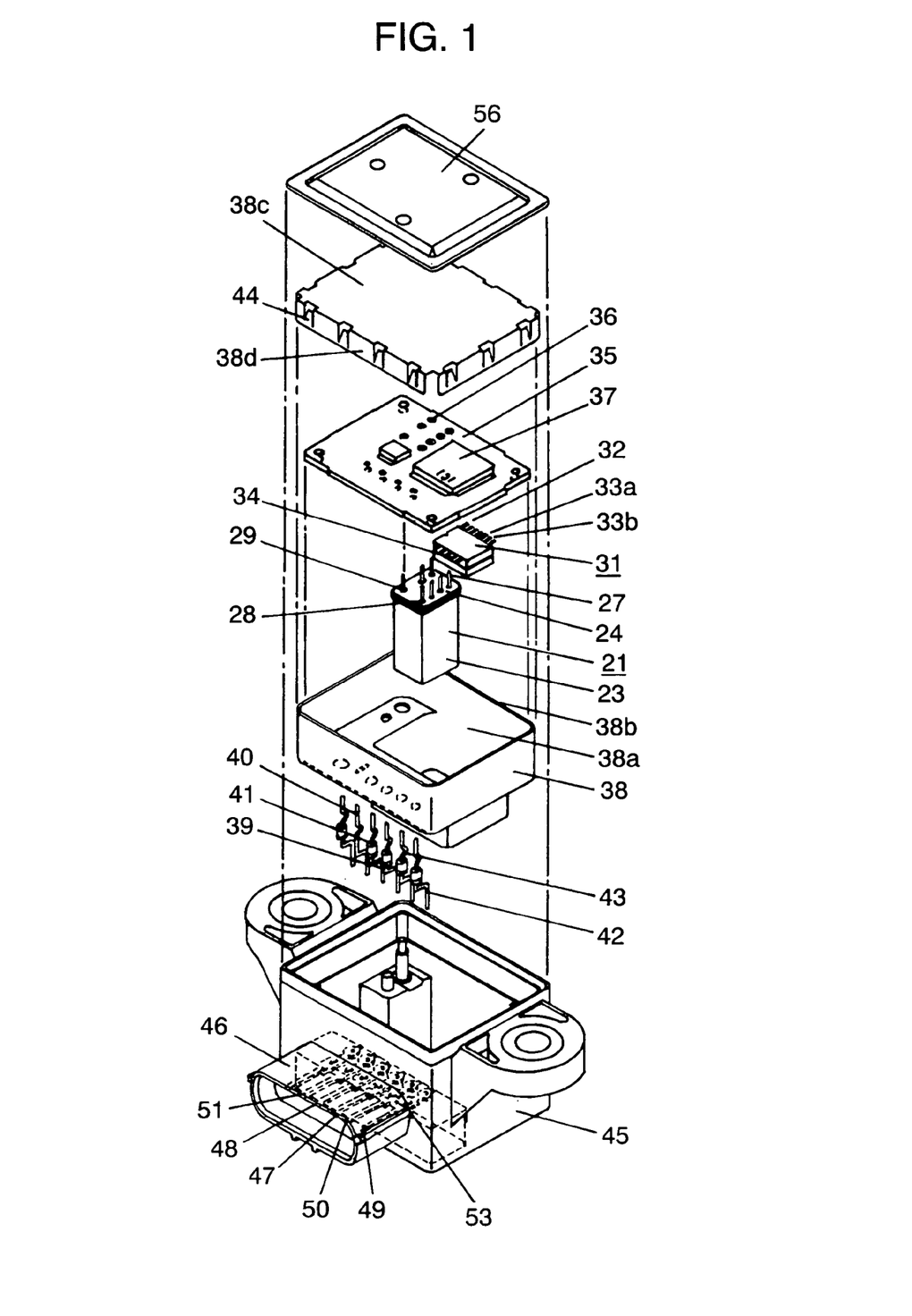
FIG. 1 shows an exploded perspective view of a complex sensor in accordance with an exemplary embodiment of the present invention.
Figure 3:
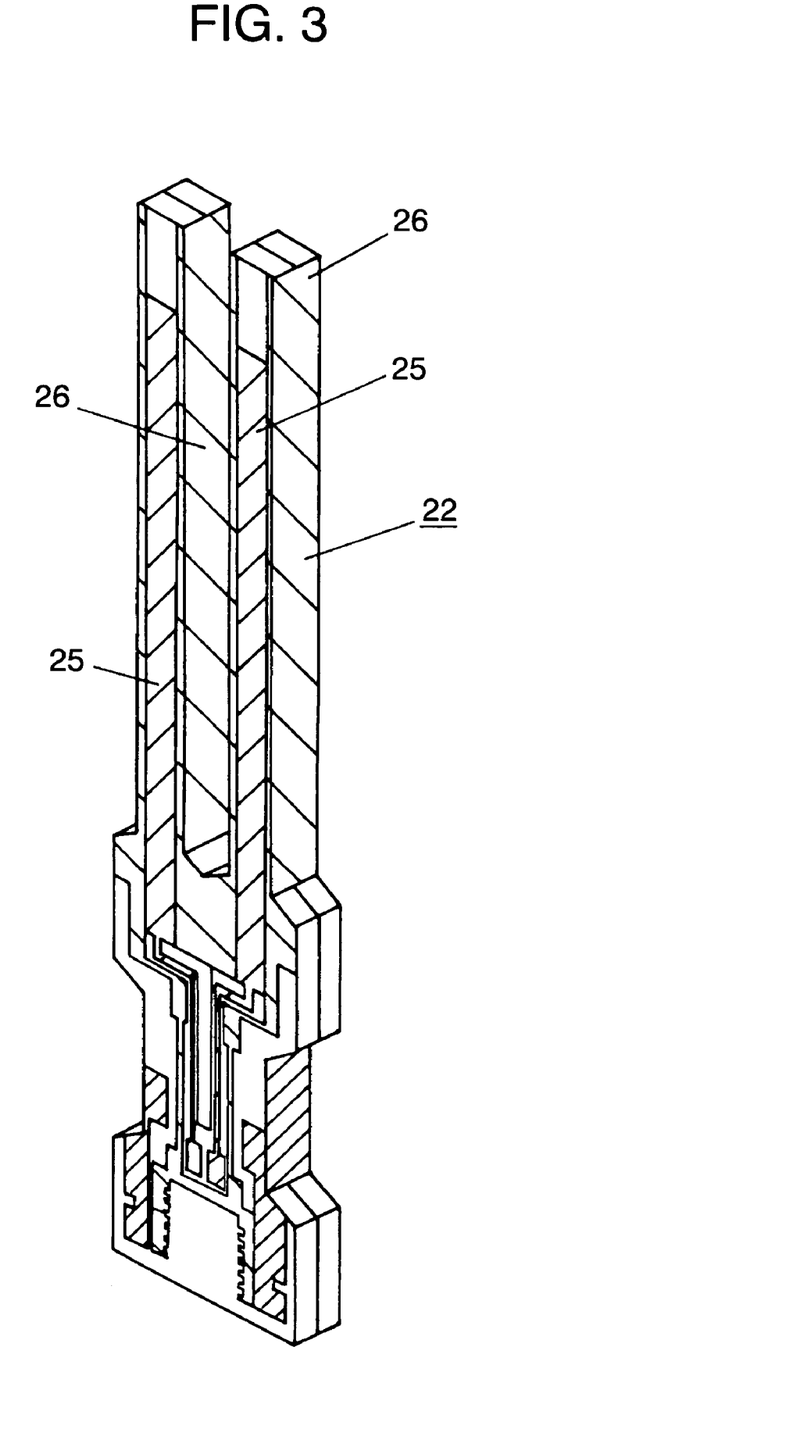
FIG. 3 is a perspective view showing an angular velocity detection device of the complex sensor in accordance with the exemplary embodiment of the present invention, with a case and lid removed.

Referring to FIG. 1, an angular velocity detection device 21 includes: vibration body 22, which is a tuning fork, as shown in FIG. 3, formed of thin sheets of single-crystalline quartz affixed together, each sheet having a different crystalline axis; case 23 for housing vibration body 22; and lid 24 for closing an opening of case 23. Vibration body 22 of the angular velocity detection device 21 is provided at front and reverse surfaces with drive electrode 25, and at outer and inner side surfaces with detection electrode 26. Case 23 of the angular velocity detection device 21 houses vibration body 22, and is provided with an opening (not shown) at an upper end. Lid 24 of the angular velocity detection device 21 is provided with power supply terminal 27, angular velocity output terminal 28 and GND terminal 29. Each terminal is penetrating through from an upper surface to a lower surface of the lid, and power supply terminal 27 and GND terminal 29 are electrically connected at their one end with drive electrode 25 of vibration body 22. On e end of angular velocity output terminal 28 of lid 24 is electrically connected with the detection electrode of vibration body 22. An acceleration detection device 31 in FIG. 1 is a static capacitance type acceleration sensor, which sensor has a movable electrode plate (not shown) and a fixed electrode plate (not shown) inside thereof. Power supply terminal 32, X axis acceleration output terminal 33a, Y axis acceleration output terminal 33b and GND terminal 34, electrically connected respectively at their one end with a movable electrode plate (not shown) and fixed electrode plate (not shown), are protruding exteriorly.

Circuit board 35 has the angular velocity detection device 21 mounted and fixed on a lower surface thereof, and is provided with a number of terminal insertion holes 36 penetrating through from top to bottom. Power supply terminal 27, angular velocity output terminal 28 and GND terminal 29 of the angular velocity detection device 21 are inserted respectively through one of terminal insertion holes 36.

Circuit board 35 is mounted and fixed with the acceleration detection device 31 at its bottom surface; while on its upper surface, processing circuit 37 containing an AGC circuit (not shown) formed of electronic components is provided.

Processing circuit 37 is electrically connected with power supply terminal 27, angular velocity output terminal 28 and GND terminal 29 of angular velocity detection device 21, as well as with power supply terminal 32, X axis acceleration output terminal 33a, Y axis acceleration output terminal 33b and GND terminal 34 of acceleration detection device 31. Metal shield case 38 is formed of storage portion 38a and lid 38c for closing storage portion 38a at opening 38b. Shield case 38 houses circuit board 35, angular velocity detection device 21 and acceleration detection device 31, and is provided with power conjunction terminal 39, GND conjunction terminal 40, angular velocity conjunction terminal 41, X axis acceleration conjunction terminal 42 and Y axis acceleration conjunction terminal 43, with each of these conjunction terminals penetrating from inside to outside. One of ends of power conjunction terminal 39 of shield case 38 is electrically connected with power supply terminal 27 of angular velocity detection device 21 and power supply terminal 32 of acceleration detection device 31. One of ends of GND conjunction terminal 40 is electrically connected with GND terminal 29 of angular velocity detection device 21 and GND terminal 34 of acceleration detection device 31.

One of ends of angular velocity conjunction terminal 41 is electrically connected with angular velocity output terminal 28 of angular velocity detection device 21. One of ends of X axis acceleration conjunction terminal 42 is electrically connected with X axis acceleration output terminal 33a of acceleration detection device 31. One of ends of Y axis acceleration conjunction terminal 43 is electrically connected with Y axis acceleration output terminal 33b of acceleration detection device 31. Lid 38c of shield case 38 is provided with elastic convexity 44, which is formed by providing a cut in vertical portion 38d. By taking advantage of elastic convexity 44, lid 38c can be attached fast at opening 38b of shield case 38 with elastic contact around an outer circumference thereof, and storage portion 38a and lid 38c are brought to the same electrical potential.

Since shield case 38 is formed of bottomed storage portion 38a and lid 38c for closing storage portion 38a at opening 38b, and lid 38c is provided with elastic convexity 44 directed towards storage portion 38a, lid 38c can be attached fast to opening 38b of storage portion 38a without needing a separate member to be prepared for this specific purpose. This contributes to reduce a number of components in a complex sensor. Resin-made protection case 45 of a bottomed shape houses shield case 38, and is provided with connector portion 46 protruding outward from its side. Provided inside the connector portion 46 are; one of two ends of power connector terminal 47, angular velocity connector terminal 48, X axis acceleration connector terminal 49, Y axis acceleration connector terminal 50 and GND connector terminal 51, with their other ends being buried in protection case 45.

Figure 2:
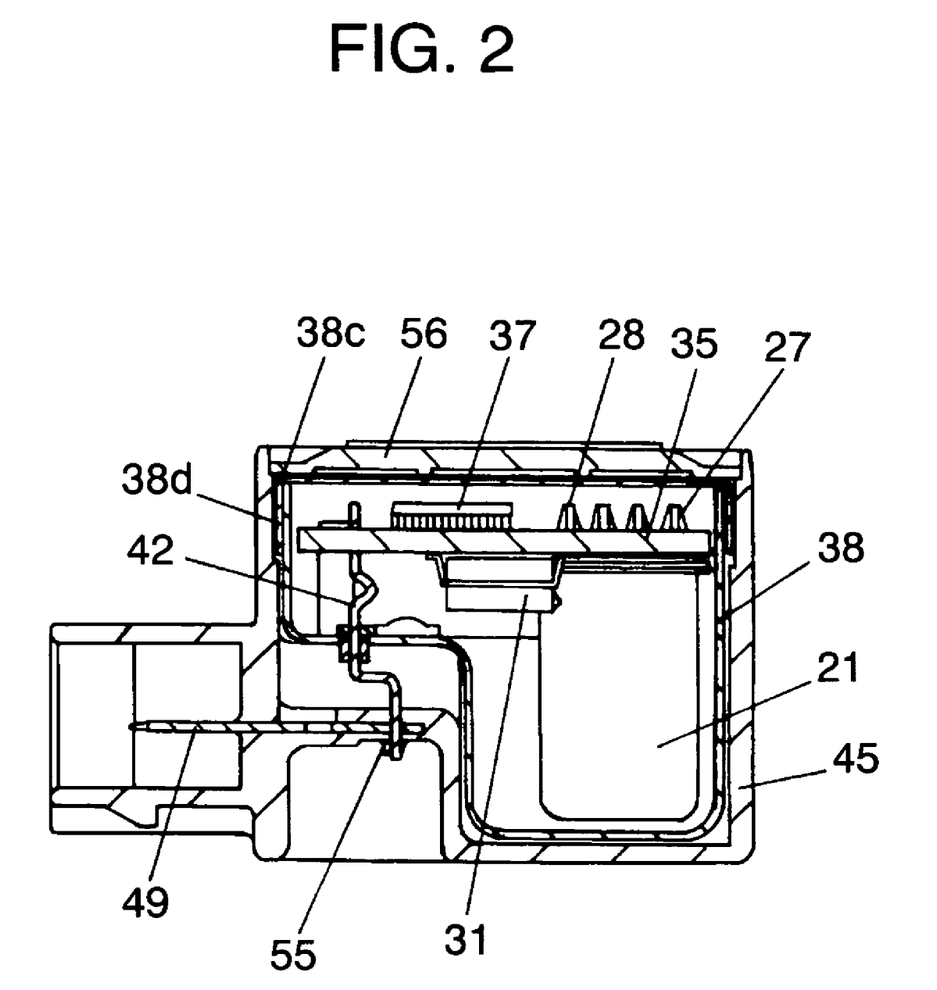
FIG. 2 shows a cross sectional view of the complex sensor in accordance with the exemplary embodiment of the present invention.
Figure 4:
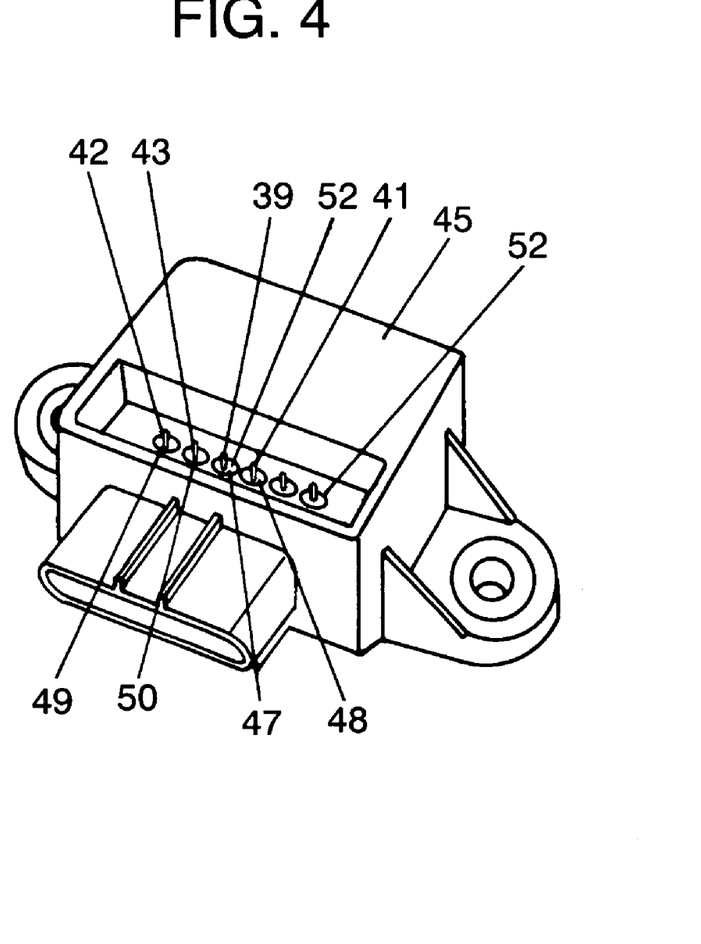
FIG. 4 is a perspective of the complex sensor in accordance with the exemplary embodiment of the present invention, as viewed from underneath.
Figure 5:
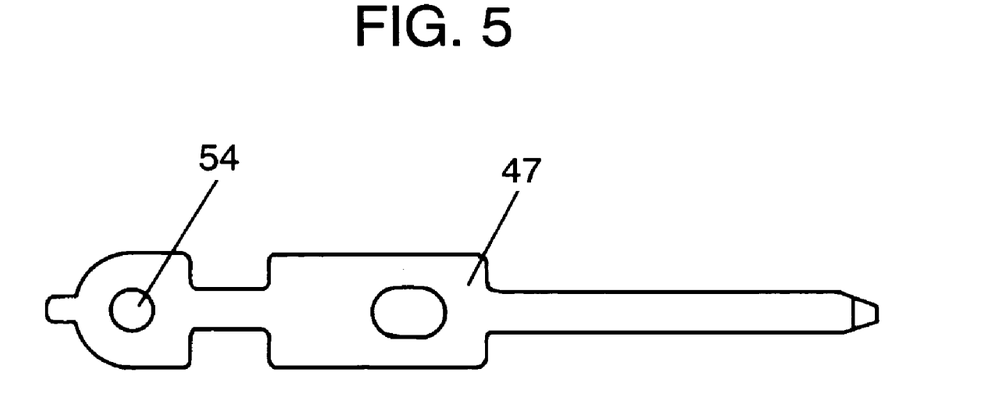
FIG. 5 is a plan view of a power connector terminal, disposed in a protection case of the complex sensor in accordance with the exemplary embodiment of the present invention.

As shown in FIG. 4, protection case 45 is provided with through holes 52 penetrating from a bottom surface to an outer bottom surface. Meanwhile, power connector terminal 47, angular velocity connector terminal 48, X axis acceleration connector terminal 49 and Y axis acceleration connector terminal 50 are provided at their other ends with hole 54, as illustrated in FIG. 5, penetrating from the upper surface to the lower surface. Hole 54 is disposed to coincide with through hole 52 of protection case 45. The other end of X axis acceleration conjunction terminal 42 is inserted into hole 54 of X axis acceleration connector terminal 49 disposed in protection case 45, and these are connected together by solder 55 for electrical connection, as shown in FIG. 2. The other end of Y axis acceleration conjunction terminal 43 is inserted into hole 54 of Y axis acceleration connector terminal 50, and these are connected together by solder 55 for electrical connection. The other end of power conjunction terminal 39 is inserted into hole 54 of power connector terminal 47, and these are connected together by solder 55 for electrical connection. The other end of GND conjunction terminal 40 is inserted into hole 54 of GND connector terminal 51, and these are connected together by solder 55 for electrical connection. Resin-made protection lid 56 closes an open end of protection case 45. Whenever necessary from a view point of manufacturing, each of the connector terminals may of course be provided with additional holes, besides hole 54.

Now, description is made in the following of a method of manufacturing the above-configured complex sensor for detecting angular velocity and acceleration in accordance with an exemplary embodiment of the present invention.

Initially, gold is vapor-deposited onto quartz vibration body 22, provided in advance with a tuning fork shape, at a front surface and reverse surface thereof, for forming drive electrode 25.

Vibration body 22 is further provided with gold deposition at an outer side surface and inner side surface thereof, for forming detection electrode 26. And then, power supply terminal 27, angular velocity output terminal 28 and GND terminal 29 are inserted into lid 24 from an upper surface towards a lower surface thereof so that each of the terminals is protruding in both upward and downward directions.

After vibration body 22 is housed in case 23, the opening of case 23 is closed with lid 24, to complete angular velocity detection device 21. Acceleration detection device 31, which is provided in advance, is attached and fixed on the lower surface of circuit board 35 so that power supply terminal 32, X axis acceleration output terminal 33a, Y axis acceleration output terminal 33b and GND terminal 34 of acceleration detection device 31 make electrical contact with circuit board 35.

Power supply terminal 27, angular velocity output terminal 28 and GND terminal 29 of angular velocity detection device 21 are inserted into terminal insertion holes 36 of circuit board 35 from underneath, and soldered.

On the upper surface of circuit board 35, processing circuit 37 formed of electronic components is mounted and fixed. At the storage portion 38a of shield case 38, power conjunction terminal 39, GND conjunction terminal 40, angular velocity conjunction terminal 41, X axis acceleration conjunction terminal 42 and Y axis acceleration conjunction terminal 43 are inserted from the inner bottom surface towards the outer bottom surface so that each of the terminals is protruding in both upward and downward directions. Next, circuit board 35 is put into shield case 38 so that one end of the two ends of respective power conjunction terminal 39, GND conjunction terminal 40, angular velocity conjunction terminal 41, X axis acceleration conjunction terminal 42 and Y axis acceleration conjunction terminal 43 penetrates terminal insertion holes 36.

Lid 38c made of a thin sheet is provided with cuts along an edge part and a relevant portion is arched to form elastic convexity 44. And then, lid 38c is bent at four circumferential sides to form vertical portion 38d. Opening 38b of shield case 38 is covered with lid 38c; and lid 38c sticks fast to the opening with elasticity caused by elastic convexity 44 formed in a vertical portion of lid 38c. Therefore, no additional component is needed to be dedicated for attaching lid 38c onto the opening.

Next, power connector terminal 47, angular velocity connector terminal 48, X axis acceleration connector terminal 49, Y axis acceleration connector terminal 50 and GND connector terminal 51, each of which has been provided at the other end with hole 54 penetrating from the upper surface through the lower surface as shown in FIG. 5, and a supporting pin (not shown) are disposed at their places. Molten resin is supplied to molds (not shown). Power connector terminal 47, angular velocity connector terminal 48, X axis acceleration connector terminal 49, Y axis acceleration connector terminal 50 and GND connector terminal 51 are thus buried in protection case 45, and through hole 52 is provided in a region above and underneath hole 54. Shield case 38 is put into protection case 45 so that the other ends of respective power conjunction terminal 39, GND conjunction terminal 40, angular velocity conjunction terminal 41, X axis acceleration conjunction terminal 42 and Y axis acceleration conjunction terminal 43 coming out of shield case 38 are inserted into corresponding through holes 52 of protection case 45 from above.

As shown in FIG. 4, power conjunction terminal 39 is soldered to power connector terminal 47 from a bottom of protection case 45, angular velocity conjunction terminal 41 is soldered to angular velocity connector terminal 48, X axis acceleration conjunction terminal 42 is soldered to X axis acceleration connector terminal 49, Y axis acceleration conjunction terminal 43 is soldered to Y axis acceleration connector terminal 50, and GND conjunction terminal 40 is soldered to GND connector terminal 51. Finally, the opening of protection case 45 is closed with protection lid 56.

Now, operation of a complex sensor configured and assembled as described above in accordance with an exemplary embodiment of the present invention is described in the following.

An input voltage delivered from an external DC power source (not shown) is converted by processing circuit 37 into AC voltage, which voltage is applied to drive electrode 25 of vibration body 22 in angular velocity detection device 21, via power supply terminal 27. Drive electrode 25 is grounded via GND connector terminal 51, GND conjunction terminal 40 and the GND terminal. Then, vibration body 22 is bent and vibrates. In this state, when angular velocity detection device 21 is revolved around a central axis in a length direction of vibration body 22 at an angular velocity ù, a Coriolis force F=2 mvù is generated with vibration body 22.

An output signal caused by electric charges generated at detection electrode 26 due to the Coriolis force is sent via angular velocity output terminal 28 to processing circuit 37 on circuit board 35 to be converted into an output voltage. This voltage is delivered via angular velocity conjunction terminal 41 and angular velocity connector terminal 48 to a computer (not shown), and an angular velocity is detected by the computer.

Likewise, under a state where a 5V voltage is applied to the movable electrode plate (not shown) and fixed electrode plate (not shown) of acceleration detection device 31 via power connector terminal 47, power conjunction terminal 39 and power supply terminal 27, when an acceleration is exerted in an X axis and Y axis direction, or a direction horizontal to a plane of acceleration detection device 31, the movable electrode plate (not shown) is dislocated to cause a change in capacitance of a capacitor formed between the movable electrode plate (not shown) and the fixed electrode plate (not shown).

A shift in the capacitance is converted within acceleration detection device 31 into an output voltage, and acceleration in an X axis direction is delivered via X axis acceleration output terminal 33a, X axis acceleration conjunction terminal 42 and X axis acceleration connector terminal 49 to a computer (not shown). The computer detects the acceleration in X axis direction.

Likewise, acceleration in a Y axis direction is delivered via Y axis acceleration output terminal 33b, Y axis acceleration conjunction terminal 43 and Y axis acceleration connector terminal 50 to the computer (not shown). The computer detects the acceleration in Y axis direction. The computer (not shown) analyzes the angular velocity, the acceleration in X axis direction and the acceleration in Y axis direction exerted to a vehicle, and identifies behavior of the vehicle. Now, description is made of a situation where a complex sensor is put into operation in an environment of quite a number of electromagnetic waves. In a complex sensor in accordance with exemplary embodiment of the present invention, shield case 38 is provided with power conjunction terminal 39, GND conjunction terminal 40, angular velocity conjunction terminal 41, X axis acceleration conjunction terminal 42 and Y axis acceleration conjunction terminal 43, and both power supply terminal 27 of angular velocity detection device 21 and power supply terminal 32 of acceleration detection device 31 are electrically connected with power connector terminal 47 of protection case 45 via power conjunction terminal 39 of shield case 38. Both GND terminal 29 of angular velocity detection device 21 and GND terminal 29 of acceleration detection device 31 are electrically connected with GND connector terminal 51 of protection case 45 via GND conjunction terminal 40 of shield case 38. In this way, circuit board 35 is contained completely within shield case 38. As a result, a circuit pattern (not shown) of circuit board 35 is not affected by electromagnetic waves from outside, and stable output signals are available from the circuit pattern (not shown) of circuit board 35. An advantage comes from that the complex sensor is fixed directly on a circuit board, and the circuit board has been completely shielded electromagnetically. In conventional structures, a complex sensor is coupled with a circuit board via a supporting substrate, in order to secure a sufficient mechanical strength. Therefore, an effect of shielding was not always quite satisfactory, because of this basic structure.

Next, description is made of a complex sensor operating in an environment of strong vibration.

In a complex sensor in accordance with an exemplary embodiment of the present invention, power connector terminal 47, GND connector terminal 51, angular velocity connector terminal 48, X axis acceleration connector terminal 49 and Y axis acceleration connector terminal 50 of protection case 45 are provided respectively with holes 54; and power conjunction terminal 39, GND conjunction terminal 40, angular velocity conjunction terminal 41, X axis acceleration conjunction terminal 42 and Y axis acceleration conjunction terminal 43 of shield case 38 are inserted respectively into holes 54, respectively, for electrical connection. Thus, a tough connection is established between power connector terminal 47 and power conjunction terminal 39, between GND connector terminal 51 and GND conjunction terminal 40, between angular velocity connector terminal 48 and angular velocity conjunction terminal 41, between X axis acceleration connector 49 and X axis acceleration conjunction terminal 42, and between Y axis acceleration connector terminal 50 and Y axis acceleration conjunction terminal 43. Therefore, complex sensors are provided with a mechanical strength that is strong enough to withstand vibration. In this way, the present invention offers complex sensors which have improved reliability.

INDUSTRIAL APPLICABILITY

Complex sensors in the present invention are protected against vibration and electromagnetic wave noise coming from outside. Thus, the complex sensors are provided with improved reliability.

Furthermore, the complex sensors in the present invention can be implemented with a smaller number of constituent components, which contributes to a lower manufacturing cost.

The invention claimed is:

1. A complex sensor for detecting angular velocity and acceleration, comprising:
   an angular velocity detection device for detecting angular velocity, said angular velocity detection device including a power supply terminal, a GND terminal and angular velocity output terminal;
   an acceleration detection device for detecting acceleration, said acceleration detection device including a power supply terminal, a GND terminal and an acceleration output terminal;
   a circuit board having a processing circuit for processing an angular velocity signal delivered from said angular velocity output terminal, and an acceleration signal delivered from said acceleration output terminal, wherein said angular velocity detection device and said acceleration detection device are disposed on said circuit board;
   a protective case having through holes in a surface thereof and provided with a connector portion extending from a side of said protective case in a direction parallel to a side of said circuit board, and a power connector terminal, a GND connector terminal, an angular velocity connector terminal, and an acceleration connector terminal positioned within said connector portion;
   a metal shield case housed within said protective case, said metal shield case completely surrounding said circuit board, said angular velocity detection device and said acceleration detection device;
   a power conjunction terminal extending through said metal shield case into a first of said through holes and having one end thereof electrically connected to both said power supply terminal of said angular velocity detection device and said power supply terminal of said acceleration detection device and another end thereof electrically connected to said power connector terminal, a GND conjunction terminal extending through said metal shield case into a second of said through holes and having one end thereof electrically connected to both said acceleration detection device and another end thereof electrically connected to said GND connector terminal, an angular velocity conjunction terminal extending through said metal shield case into a third of said through holes and having one end thereof electrically connected to said angular velocity connector terminal, and an acceleration conjunction terminal extending through said metal shield case into a fourth of said through holes and having one end thereof electrically connected to said acceleration output terminal and another end thereof electrically connected to said acceleration connector terminal,
   wherein said power connector terminal, said GND connector terminal, said angular velocity connector terminal and said acceleration connector terminal, positioned within said connector portion of said protective case, extend therefrom into orthogonally adjacent alignment with said power conjunction terminal, said GND conjunction terminal, said angular velocity conjunction terminal and said acceleration conjunction terminal, respectively, and
   wherein each connector terminal is electrically connected to each respective conjunction terminal at the location of each respective through hole.

2. The complex sensor according to claim 1, wherein said metal shield case includes a lid and a storage portion having an opening and a bottom, with said lid having an elastic convexity for attaching said lid to said storage portion via elastic engagement so as to close the opening of said storage portion, and for bringing said storage portion and said lid to the same electrical potential.

3. The complex sensor according to claim 2, wherein
said metal shield case has respective openings through which each of said power conjunction terminal, said GND conjunction terminal, said angular velocity conjunction terminal and said acceleration conjunction terminal extend.

4. The complex sensor according to claim 3, wherein
said power connector terminal has a hole aligned with a first of said through holes of said protective case, with said another end of said power conjunction terminal extending into said hole of said power connector terminal,
said GND connector terminal has a hole aligned with a second of said through holes of said protective case, with said another end of said GND conjunction terminal extending into said hole of said GND connector terminal,
said angular velocity connector terminal has a hole aligned with a third of said through holes of said protective case, with said another end of said angular velocity conjunction terminal extending into said hole of said angular velocity connector terminal,
said acceleration connector terminal has a hole aligned with a fourth of said through holes of said protective case, with said another end of said acceleration conjunction terminal extending into said hole of said acceleration connector terminal.

5. The complex sensor according to claim 4, wherein
said power connector terminal, said GND connector terminal, said angular velocity connector terminal and said acceleration connector terminal are integrally molded into said protective case.

6. The complex sensor according to claim 5, wherein
said processing circuit is provided on a first side of said circuit board, and
said angular velocity detection device and said acceleration detection device are disposed directly on a second side of said circuit board,
with said first side and said second side facing in opposite directions.

7. The complex sensor according to claim 6, wherein said elastic convexity is formed by a cut provided in a vertical part of said lid.

8. The complex sensor according to claim 7, wherein
said first side comprises a top side of said circuit board, and
said second side comprises a bottom side of said circuit board.

9. The complex sensor according to claim 2, wherein said elastic convexity is formed by a cut provided in a vertical part of said lid.

10. The complex sensor according to claim 2, wherein
said power connector terminal has a hole aligned with a first of said through holes of said protective case, with said another end of said power conjunction terminal extending into said hole of said power connector terminal,
said GND connector terminal has a hole aligned with a second of said through holes of said protective case, with said another end of said GND conjunction terminal extending into said hole of said GND connector terminal,
said angular velocity connector terminal has a hole aligned with a third of said through holes of said protective case, with said another end of said angular velocity conjunction terminal extending into said hole of said angular velocity connector terminal,
said acceleration connector terminal has a hole aligned with a fourth of said through holes of said protective case, with said another end of said acceleration conjunction terminal extending into said hole of said acceleration connector terminal.

11. The complex sensor according to claim 2, wherein
said power connector terminal, said GND connector terminal, said angular velocity connector terminal and said acceleration connector terminal are integrally molded into said protective case.

12. The complex sensor according to claim 2, wherein
said processing circuit is provided on a first side of said circuit board, and
said angular velocity detection device and said acceleration detection device are disposed directly on a second side of said circuit board,
with said first side and said second side facing in opposite directions.

13. The complex sensor according to claim 1, wherein
said processing circuit is provided on a first side of said circuit board, and
said angular velocity detection device and said acceleration detection device are disposed directly on a second side of said circuit board,
with said first side and said second side facing in opposite directions.

14. The complex sensor according to claim 13, wherein
said first side comprises a top side of said circuit board, and
said second side comprises a bottom side of said circuit board.

15. The complex sensor according to claim 1, wherein
said metal shield case has respective openings through which each of said power conjunction terminal, said GND conjunction terminal, said angular velocity conjunction terminal and said acceleration conjunction terminal extend.

16. The complex sensor according to claim 1, wherein
said power connector terminal has a hole aligned with a first of said through holes of said protective case, with said another end of said power conjunction terminal extending into said hole of said power connector terminal,
said GND connector terminal has a hole aligned with a second of said through holes of said protective case, with said another end of said GND conjunction terminal extending into said hole of said GND connector terminal,
said angular velocity connector terminal has a hole aligned with a third of said through holes of said protective case, with said another end of said angular velocity conjunction terminal extending into said hole of said angular velocity connector terminal,
said acceleration connector terminal has a hole aligned with a fourth of said through holes of said protective case, with said another end of said acceleration conjunction terminal extending into said hole of said acceleration connector terminal.

17. The complex sensor according to claim 1, wherein
said power connector terminal, said GND connector terminal, said angular velocity connector terminal and said acceleration connector terminal are integrally molded into said protective case.

* * * * *